United States Patent
Patel

(10) Patent No.: US 11,449,636 B2
(45) Date of Patent: Sep. 20, 2022

(54) SYSTEMS AND METHODS FOR SECURE PROVISIONING OF DATA USING SECURE TOKENS

(71) Applicant: MASTERCARD INTERNATIONAL INCORPORATED, Purchase, NY (US)

(72) Inventor: Keyur Patel, Jersey City, NJ (US)

(73) Assignee: MASTERCARD INTERNATIONAL INCORPORATED, Purchase, NY (US)

( * ) Notice: Subject to any disclaimer, the term of this patent is extended or adjusted under 35 U.S.C. 154(b) by 396 days.

(21) Appl. No.: 16/593,074

(22) Filed: Oct. 4, 2019

(65) Prior Publication Data

US 2021/0103679 A1    Apr. 8, 2021

(51) Int. Cl.
| | |
|---|---|
| *G06F 21/00* | (2013.01) |
| *G06F 21/62* | (2013.01) |
| *H04L 9/32* | (2006.01) |
| *H04L 9/08* | (2006.01) |
| *G06F 21/33* | (2013.01) |

(52) U.S. Cl.
CPC .......... *G06F 21/6254* (2013.01); *G06F 21/33* (2013.01); *H04L 9/0866* (2013.01); *H04L 9/3213* (2013.01); *H04L 2209/56* (2013.01)

(58) Field of Classification Search
CPC . G06F 21/6254; G06F 21/602; G06Q 40/025; G06Q 40/02; H04L 9/0643; H04L 9/3213
See application file for complete search history.

(56) References Cited

U.S. PATENT DOCUMENTS

| | | |
|---|---|---|
| 6,223,289 B1 | 4/2001 | Wall et al. |
| 7,730,321 B2 | 6/2010 | Gasparini et al. |
| (Continued) | | |

FOREIGN PATENT DOCUMENTS

| | | |
|---|---|---|
| EP | 961193 A2 | 9/2010 |
| WO | 2010139250 A1 | 12/2010 |
| (Continued) | | |

OTHER PUBLICATIONS

"Quick Guide to GUIDs" by Better Explained (Year: 2018).*
(Continued)

*Primary Examiner* — Morshed Mehedi
(74) *Attorney, Agent, or Firm* — Armstrong Teasdale LLP

(57) ABSTRACT

A secure token (ST) system including at least one ST computing device to provision data using secure tokens over a network is provided. The ST computing device is configured to receive first customer data from a credit issuer computing device, the first customer data including at least one or more account identifiers associated with a customer and a social security number (SSN) associated with the customer. The ST computing device is also configured to hash the SSN, wherein the hashed SSN includes a hash value, assign a unique identifier to each of the one or more account identifiers, and generate a secure token by associating the hash value to each unique identifier. The ST computing device is further configured to store the secure token within the database, and transmit the secure token to at least one of the credit issuer computing device and a third party computing device.

19 Claims, 5 Drawing Sheets

(56) References Cited

U.S. PATENT DOCUMENTS

| | | |
|---|---|---|
| 7,886,156 B2 | 2/2011 | Franchi |
| 8,812,860 B1 | 8/2014 | Bray |
| 9,811,684 B1* | 11/2017 | Sterling .................. G06F 21/31 |
| 10,219,154 B1 | 2/2019 | Hallock |
| 11,055,727 B1 | 7/2021 | Kumar |
| 2003/0074564 A1 | 4/2003 | Peterson |
| 2005/0264397 A1 | 12/2005 | Coelho et al. |
| 2006/0288405 A1 | 12/2006 | Albisu et al. |
| 2007/0162961 A1 | 7/2007 | Tarrance et al. |
| 2008/0212771 A1 | 9/2008 | Hauser |
| 2008/0313088 A1 | 12/2008 | Cahn |
| 2008/0313707 A1 | 12/2008 | Jain et al. |
| 2011/0055585 A1* | 3/2011 | Lee ....................... H04L 9/3263 |
| | | 713/183 |
| 2011/0161233 A1* | 6/2011 | Tieken ............... G06Q 20/4014 |
| | | 705/71 |
| 2011/0213807 A1 | 9/2011 | Mattsson |
| 2011/0239283 A1 | 9/2011 | Chern |
| 2013/0081125 A1* | 3/2013 | Ho ..................... H04L 67/1027 |
| | | 726/8 |
| 2013/0133059 A1 | 5/2013 | Maman et al. |
| 2013/0191884 A1 | 7/2013 | Leicher et al. |
| 2013/0208893 A1 | 8/2013 | Shablygin et al. |
| 2013/0226813 A1 | 8/2013 | Voltz |
| 2013/0318348 A1 | 11/2013 | Lebron et al. |
| 2014/0013452 A1* | 1/2014 | Aissi ...................... G06F 21/85 |
| | | 726/30 |
| 2014/0075513 A1 | 3/2014 | Trammel et al. |
| 2014/0229462 A1 | 8/2014 | Lo |
| 2015/0127547 A1 | 5/2015 | Powell et al. |
| 2015/0254645 A1* | 9/2015 | Bondesen ............ G06Q 20/385 |
| | | 705/41 |
| 2017/0140174 A1 | 5/2017 | Lacey et al. |
| 2017/0352039 A1 | 12/2017 | Malkawi |
| 2018/0034796 A1 | 2/2018 | Ross et al. |
| 2018/0192287 A1 | 7/2018 | Ozzie |
| 2019/0044940 A1 | 2/2019 | Khalil et al. |
| 2019/0087825 A1 | 3/2019 | Bhatt et al. |
| 2019/0147170 A1 | 5/2019 | Keselman et al. |
| 2019/0281036 A1 | 9/2019 | Eisen et al. |
| 2020/0186566 A1* | 6/2020 | Fox ..................... H04L 63/1483 |
| 2020/0211002 A1* | 7/2020 | Steinberg ............ G06Q 20/385 |
| 2020/0234288 A1* | 7/2020 | Diana .................. G06Q 20/363 |

FOREIGN PATENT DOCUMENTS

| | | |
|---|---|---|
| WO | 2013101297 A1 | 7/2013 |
| WO | 2014153979 A1 | 10/2014 |
| WO | 2017028804 A1 | 2/2017 |
| WO | 2017210563 A1 | 12/2017 |

OTHER PUBLICATIONS

Jensen et al., "On Technical Security Issues in Cloud Computing", 2009 IEEE International Conference on Cloud Computing, Date of Conference: Sep. 21-25, 2000.*

PCT International Search Report and Written Opinion, Application No. PCT/US2020/046912, dated Nov. 30, 2020, 10 pps.

PCT International Search Report and Written Opinion, Application No. PCT/US2020/046908, dated Oct. 29, 2020, 13 pps.

* cited by examiner

SYSTEMS AND METHODS FOR SECURE PROVISIONING OF DATA USING SECURE TOKENS

BACKGROUND

This disclosure relates generally to secure data transmission and storage systems, and more specifically, to secure provisioning of data using secure tokens over a network.

Persistent user identifiers, such as driver's license numbers and social security numbers, may be used to identify users, access records associated with the user, and/or verify the user's identity. For example, bank records associated with a specific user may be retrieved using a user's social security number, where retrieving user records using a name may be imprecise due to multiple users having the same name. As another example, a persistent user identifier may be considered a secret known only by the user, and thus, said secret may be used to verify the user's identity. For example, bank records including a social security number may be provided to a user after they prove they know the secret value (e.g., the social security number).

For at least these reasons, persistent user identifiers are extremely high value data from a computing perspective. Cybersecurity principles suggest that persistent user identifiers should not be transmitted in clear text, and further, even encrypted transmission and storage of persistent user identifiers should be minimized to reduce an attack surface and in an effort to maintain the secrecy of the identifiers.

However, as described previously, persistent user identifiers are deeply integrated into existing business practices (e.g., user authentication, record location). Additionally, existing data may be stored (e.g., indexed) based on persistent user identifiers, and restructuring the data to avoid reliance on these identifiers may be particularly time consuming and complex.

There is a need for a computing system configured to mitigate the use of persistent user identifiers, while still allowing access to data indexed based on the identifiers.

BRIEF DESCRIPTION

In one embodiment, a secure token (ST) system operable to provision data using secure tokens over a network is provided. The ST system includes at least one ST computing device including at least one processor in communication with a database and is configured to receive first customer data from a credit issuer computing device, the first customer data including at least one or more account identifiers associated with a customer and a social security number (SSN) associated with the customer. The ST computing device is also configured to hash the SSN, wherein the hashed SSN includes a hash value, assign a unique identifier to each of the one or more account identifiers, and generate a secure token by associating the hash value to each unique identifier, wherein the secure token identifies the customer. The ST computing device is further configured to store the secure token within the database, and transmit the secure token to at least one of the credit issuer computing device and a third party computing device.

In another embodiment, a computer-implemented method for provisioning data using secure tokens over a network is provided. The method is implemented by at least one secure token (ST) computing device that includes at least one processor in communication with a database. The method includes receiving first customer data from a credit issuer computing device, the first customer data including at least one or more account identifiers associated with a customer and a social security number (SSN) associated with the customer. The method also includes hashing the SSN, wherein the hashed SSN includes a hash value, assigning a unique identifier to each of the one or more account identifiers, and generating a secure token by associating the hash value to each unique identifier, wherein the secure token identifies the customer. The method further includes storing the secure token within the database, and transmitting the secure token to at least one of the credit issuer computing device and a third party computing device.

In yet another embodiment, a non-transitory computer readable medium that includes computer-executable instructions embodied thereon is provided. When the computer-executable instructions are executed by at least one secure token (ST) computing device that includes at least one processor in communication with a database, the computer-executable instructions cause the ST computing device to receive first customer data from a credit issuer computing device, the first customer data including at least one or more account identifiers associated with a customer and a social security number (SSN) associated with the customer. The computer-executable instructions also cause the convertor computing device to hash the SSN, wherein the hashed SSN includes a hash value, assign a unique identifier to each of the one or more account identifiers, and generate a secure token by associating the hash value to each unique identifier, wherein the secure token identifies the customer. The computer-executable instructions further cause the ST computing device to store the secure token within the database, and transmit the secure token to at least one of the credit issuer computing device and a third party computing device.

BRIEF DESCRIPTION OF THE DRAWINGS

FIG. 1 is a schematic diagram illustrating a secure token (ST) system.

FIG. 2 is a schematic diagram illustrating an example computing device included in the ST system shown in FIG. 1.

FIG. 3 illustrates an example configuration of a ST computing device included in the ST system shown in FIG. 1.

FIG. 4 is an example method for generating and provisioning secure codes using the ST system shown in FIG. 1.

FIG. 5 illustrates an example configuration of a database within a computing device, along with other related computer components, that may be used to generate and provision secure tokens using the ST system shown in FIG. 1.

DETAILED DESCRIPTION

Figure 1:
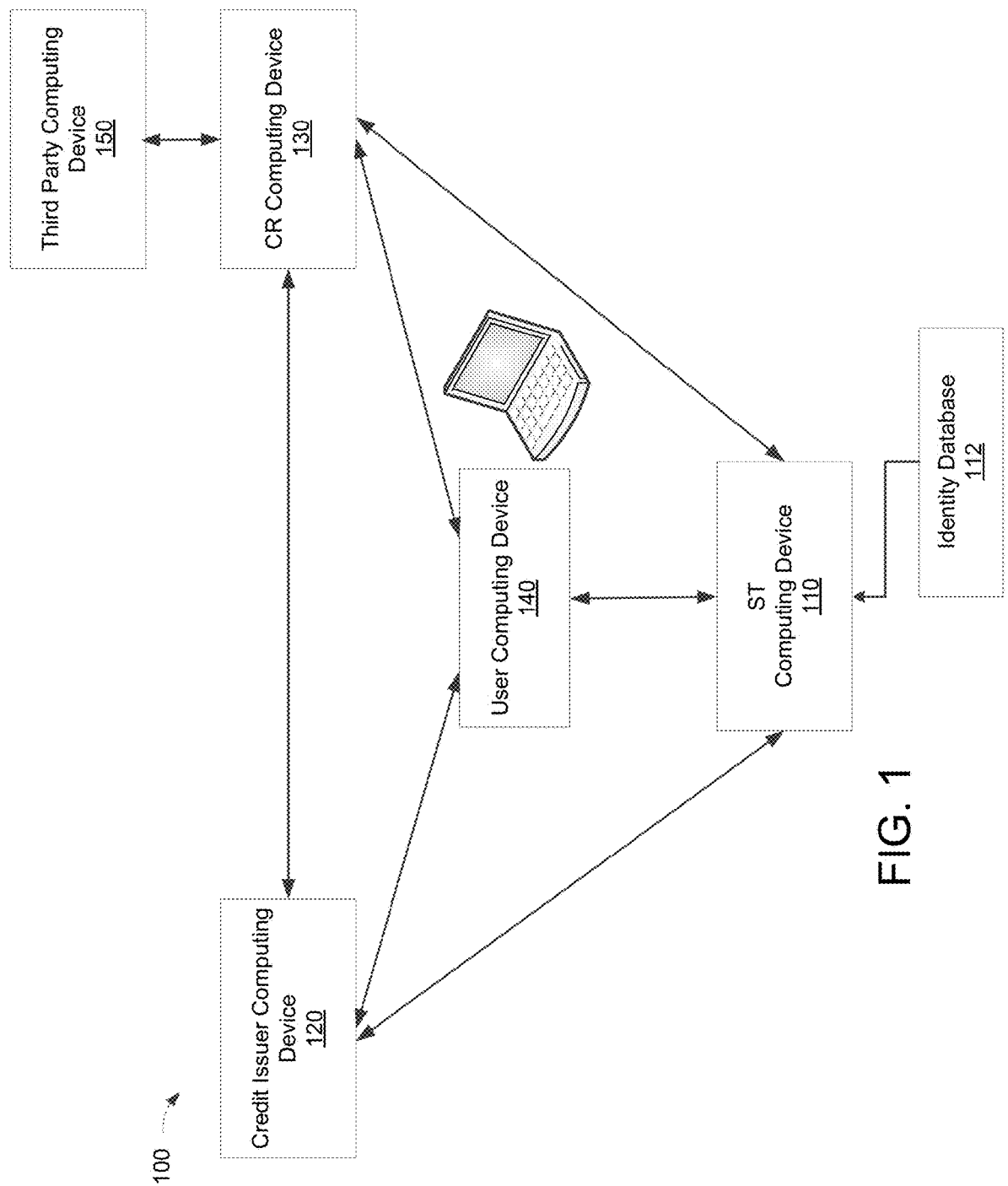
FIGS. 1-5 show example embodiments of the methods and systems described herein.

The following detailed description illustrates embodiments of the disclosure by way of example and not by way of limitation. The description enables one skilled in the art to make and use the disclosure. It also describes several embodiments, adaptations, variations, alternatives, and uses of the disclosure, including what is presently believed to be the best mode of carrying out the disclosure.

A secure token (ST) system configured to provide a ST service is described herein. The ST system includes at least one ST computing device in communication with at least one credit issuer computing device, at least one credit reporting (e.g., Experian®, Equifax®, Transunion®) computing device, at least one user computing device, and/or at least one third party computing device. The ST computing device is further in communication with at least one database that may store and/or process data, such as secure tokens, hash values, unique identifiers, and customer data.

In the example embodiment, a credit issuer may register a customer with the ST service using customer data associated with the customer. The credit issuer computing device may collect and store the customer data as part of performing a minimal Know Your Customer (KYC) check of the customer. The credit issuer computing device may perform the KYC check at the time the customer opens an account with the issuer. The KYC check may comply with government regulations designed to verify clients of the credit issuer in order to prevent money laundering, financing terrorism and other crimes involving money. The KYC check may also implement policies, procedures and technology used by, for example, payment card issuers and other financial institutions to comply with KYC regulations.

Additionally or alternatively, the ST computing device may register the customer by receiving the customer data from a user computing device associated with the customer. The user computing device may include a web-enabled phone (e.g., a "smartphone"), a personal digital assistant (PDA), a desktop computer, a laptop computer, a cellular phone, a tablet, a phablet, or other web-based connectable equipment the customer may use to communicate with other computing devices.

The customer data may include, among other data, a customer identifier (e.g., a customer social security number (SSN)), customer authentication credentials (e.g., customer name, password, biometric data, security questions, security answers, or the like), customer account data (e.g., primary account number (PAN), bank identification number (BIN), or other account related information), a user computing device identifier, a customer email address, a customer home address, a customer work address, a customer phone number, a customer driver's license number, and/or other data associated with the customer.

In some embodiments, the customer data is anonymized and aggregated (e.g., by the credit issuer computing device and/or the user computing device) prior to receipt by the ST computing device (i.e., no personally identifiable information (PII) is received by the ST computing device). In other embodiments, the ST computing device may be configured to receive customer data not yet being anonymized and/or aggregated, and thus the ST computing device may be configured to anonymize and aggregate the customer data. In such embodiments, any PII received by the ST computing device is received and processed in an encrypted format, or is received with the consent of individuals with which the PII is associated. In situations in which the systems discussed herein collect personal information about individuals including customers, or may make use of such personal information, individuals may be provided with an opportunity to control whether such information is collected or to control whether and/or how such information is used. In addition, certain data may be processed in one or more ways before it is stored or used, so that personally identifiable information is removed.

In the example embodiment, as part of the registration process, the ST computing device receives a primary account number (PAN) assigned by the credit issuer computing device to the customer as well as the customer's social security number (SSN). Specifically, the ST computing device generates a hash value for the customer data using the SSN, and also generates a unique identifier for each PAN. For example, the ST computing device may generate one hash value per customer (e.g., each customer has only one SSN) and one or more unique identifiers (e.g., each user may have one or more PANs associated with accounts of the customer at one or more credit issuers). Once the ST computing device generates the hash value and the one or more unique identifiers, the ST computing device combines the hash value and the one or more unique identifiers into an encrypted token associated with the customer, also referred to herein as a secure token. Thus, in the example embodiment, a secure token includes one or more unique identifiers and a hash value of the customer data. The secure token enables the ST computing device to identify a customer profile of a customer without using personally identifiable information (PII) of the customer, such as the customer's SSN.

In some embodiments, the ST computing device generates the secure token without storing the received customer data. In these embodiments, the ST computing device is configured to fetch the customer data from the credit issuer computing device when the ST computing device requires it. For example, the ST computing device may require the customer data when a party requesting a credit report is a third party, as described in more detail below. In other embodiments, the ST computing device may encrypt the customer data and store the customer data in a customer profile, for example in an identity database. In some embodiments, the hash value and the unique identifier may also be encrypted. For example, the ST computing device may store public encryption keys received from the credit issuer computing device. In one embodiment, the customer data, the hash value, and/or the unique identifier are encrypted using RSA encryption. More specifically, the ST computing device may encrypt the customer data, the hash value, and/or the unique identifier using a public key associated with the credit issuer, and the credit issuer may decrypt the customer data, the hash value, and the unique identifier using a stored corresponding private key.

In the example embodiment, the ST computing device is configured to store the secure token within a database, such as an identity database. The ST computing device is also configured to transmit the secure token to at least one credit issuer computing device and/or at least one credit reporting (CR) computing device. The credit issuer computing device and the CR computing device may each store the secure token locally. In some embodiments, the credit issuer computing device may transmit the secure token to the CR computing device, for example in combination with a credit status report regarding the customer account.

In some embodiments, a user computing device subsequently initiates a request for data corresponding to a customer using a customer data request (e.g., a user and/or customer submits a credit report request for a credit report of the customer). The user computing device may be associated with the customer requesting his or her own data to the CR computing device. For example, the customer may access the CR computing device (e.g., a credit bureau) to check his or her own credit score and/or credit report. The customer may input into the user computing device login information to access the ST service, via the CR computing device, and the user computing device may transmit the customer data request, including the customer login information, to the CR computing device. In the example embodiment, the CR computing device authenticates the user who transmitted the customer data request as the customer by comparing the information submitted by the user computing device to the secure token. In one example, the CR computing device may require the user to submit his or her SSN as part of the customer data request. The CR computing device calculates the hash value for the SSN and queries all secure tokens stored at the CR computing device for a matching hash value. In another example, the customer submits his or her own SSN as part of the registration process with the ST service and the hashed SSN is linked to the customer's login information. Therefore, the CR computing device may not require the user to re-submit his or her SSN with the customer data request. When a matching value for the hash of the submitted SSN or the stored hashed value associated with the login information is found, the CR computing device retrieves the secure token corresponding to the customer.

In some embodiments, the CR computing device may transmit the customer data request, along with the secure token, to the credit issuer computing device for authentication of the user. The credit issuer computing device transmits to the CR computing device, in response to receiving the customer data request, an authentication that verifies that the user associated with the customer data request is the authentic user. Advantageously, the CR computing device is not required to store the SSN itself in order to match a customer-submitted SSN (either at the time the customer accesses the ST service or at the time the customer registers with the ST service) to the correct customer record, thus reducing vulnerability of the CR computing device to data breaches.

In one example, once the matching secure token is retrieved, the CR computing device transmits the secure token to the credit issuer computing device. The credit issuer computing device is configured to retrieve the hash value and the one or more unique identifiers from the secure token, parse a database for a matching hash value and matching unique identifiers, retrieve the matching information, generate a report using the retrieved information, and transmit the report to the CR computing device. The CR computing device receives the report, generates a credit report using the received report, and transmits the credit report to the user computing device via display on a web page hosted by the CR computing device, or via display on a user application executing on the user computing device. The credit report may include a credit score for the customer. In another example, the CR computing device generates the credit report using the customer data request and the secure token associated with the customer, and transmits the credit report to the user computing device in the similar fashion as described above.

In the example embodiment, once the matching secure token is retrieved, the CR computing device is configured to transmit the generated report to the user computing device. In other embodiments, the CR computing device may transmit the credit score to the user computing device in the form of a data file and instruct the user computing device to generate a report using the data file. Once the report is received or generated by the user computing device, the user computing device is configured to display the report to the customer.

In other embodiments, a third party computing device initiates a request for data associated with a customer by submitting the customer data request. The third party computing device may be associated with a third party (e.g., a landlord, a lender, an agency, an employer, and/or other type of third party) interested in obtaining credit history or other information related to the customer. The third party may input into the third party computing device login information to access the ST service via the CR computing device, and the third party computing device may transmit the customer data request, including the third party login information and the customer's SSN, to the CR computing device. For example, as part of an authorization by the customer for the third party to obtain the customer's credit report, the customer provides his or her SSN to the third party, and the third party submits the SSN as part of the customer data request. The CR computing device retrieves the SSN from the customer data request, calculates the hash value for the SSN, and queries all secure tokens stored at the CR computing device for a matching hash value. When a matching value is found, the CR computing device retrieves the secure token corresponding to the customer, as described above.

In the example embodiment, the CR computing device recognizes the customer data request as submitted by the third party. For example, the CR computing device identifies a flag, within the customer data request, indicating that the requestor of the customer data is a third party (e.g., a type of requestor or requestor type). Specifically, the CR computing device receives the customer data request, parses the customer data request, identifies the flag, and determines that the requestor of the customer data request is the third party.

In general, third parties require more information of the customer besides the customer's credit score. Because the CR computing device does not store other information of the customer but the secure token, the CR computing device transmits (e.g., reroutes) the customer data request along with the secure token to the ST computing device. For example, the CR computing device retrieves the flag from the customer data request, and embeds the flag and the secure token within a computer message, which may be the customer data request.

In the example embodiment, the ST computing device receives the flag and the secure token within the computer message. In one embodiment, once the ST computing device receives the flag and the secure token, the ST computing device transmits the secure token and/or a request for customer data of the customer to the credit issuer computing device. The transmitted request may be the computer message received by the ST computing device, or another type of suitable computer message that enables the ST computing device to request the customer data of the customer. In response to receiving the request, the credit issuer computing device retrieves the customer data associated with the customer, using the hash value included in the secure token, and transmits the customer data and the secure token to the ST computing device. The customer data retrieved may include the customer's name, the customer address, the customer's PANs, and other information associated with the customer. The ST computing device may update the secure token in response to receiving updated customer data from the credit issuer computing device.

In another embodiment, once the ST computing device receives the flag and the secure token, the ST computing device retrieves the hash value from the secure token and parses the identity database, using the hash value, to retrieve the customer data associated with the customer. The customer data retrieved by the ST computing device may be substantially similar to the customer data retrieved by the credit issuer computing device, as described above.

In the example embodiment, the ST computing device masks some information of the customer data as unnecessary or unauthorized before transmitting the masked information to the CR computing device. In particular, the ST computing device masks the customer data based on the flag (e.g., the type of third party requesting the customer data). For example, a landlord may require information related to the customer's previous addresses, while a lender may require information related to the customer's previous and current bank accounts. In the landlord example, the ST computing device may be configured to provide the customer's previous address information, in a complete or masked form, and may or may not provide other information, i.e., the ST computing device may not provide the customer's masked bank account information to the landlord. In the lender example, the ST computing device may be configured to provide the customer's bank account information, in a complete or masked form, and may or may not provide other information, i.e., the ST computing device may not provide the customer's masked previous address information to the lender. Once the ST computing device masks the unnecessary or unauthorized information, the ST computing device transmits the customer data to the CR computing device along with the secure token.

The CR computing device receives the customer data and transmits the customer data to the third party computing device along with, for example, the customer's credit score. In the example embodiment, the CR computing device may be configured to transmit the customer data and the credit score to the third party computing device in the form of a report. In other embodiments, the CR computing device may transmit the customer data and the credit score to the third party computing device in the form of a data file and instruct the third party computing device to generate a report using the data file. Once the report is received or generated by the third party computing device, the third party computing device is configured to display the report to the third party in similar fashion as described above with respect to the user computing device.

In the example embodiment, the credit issuer computing device, the CR computing device, and the ST computing device communicate among each other via secure connections. More specifically, the credit issuer computing device, the CR computing device, and the ST computing device may have one or more virtual private network (VPN) connections. In other words, the ST computing device and one or more computing devices are in a secure data processing domain, which is generally isolated from the public Internet and from unrelated computing devices. This may further increase the security of the transmitted information.

Retrieving credit scores and/or credit history may require providing a social security number. However, storing and processing social security numbers and other persistent user identifiers may be subject to data privacy regulations, security compliance standards, and the like. Additionally, persistent user identifiers transmitted in clear text are a common target for cyberattacks. One aspect of the disclosure includes reducing storage of persistent user identifiers by enabling the CR computing device and the ST computing device to process requests for credit information without requiring the CR computing device and the ST computing device to store the persistent identifiers.

The technical problems addressed by the disclosure include at least one of: (i) data safety risks associated with redundant storage and transmission of persistent user identifiers, (ii) data safety risks associated with storage of persistent user identifiers on computing devices with high public exposure, (iii) data safety risks associated with insecure transmission of persistent user identifiers and customer data, and (iv) data safety risks associated with persistent user identifiers required to retrieve customer data.

The resulting technical benefits achieved by the systems and methods of the disclosure include at least one of: (i) reduced storage of persistent user identifiers across different computing systems, (ii) reduced unsecured transmission of persistent user identifiers, and (iii) access to secure customer data using temporary user identifiers instead of persistent user identifiers.

The systems and methods of the disclosure are implemented using computer programming or engineering techniques including computer software, firmware, hardware, or any combination or subset thereof, wherein the technical effects are achieved by: (i) receiving first customer data from a credit issuer computing device, the first customer data including at least one or more account identifiers associated with a customer and a social security number (SSN) associated with the customer; (ii) hashing the SSN, wherein the hashed SSN includes a hash value; (iii) assigning a unique identifier to each of the one or more account identifiers; (iv) generating a secure token by associating the hash value to each unique identifier, wherein the secure token identifies the customer; (v) storing the secure token within the database; and (vi) transmitting the secure token to at least one of the credit issuer computing device and a third party computing device.

In one embodiment, a computer program is provided, and the program is embodied on a computer-readable medium. In an example embodiment, the system is executed on a single computer system, without requiring a connection to a server computer. In a further example embodiment, the system is run in a Windows® environment (Windows is a registered trademark of Microsoft Corporation, Redmond, Wash.). In yet another embodiment, the system is run on a mainframe environment and a UNIX® server environment (UNIX is a registered trademark of X/Open Company Limited located in Reading, Berkshire, United Kingdom). In a further embodiment, the system is run on an iOS® environment (iOS is a registered trademark of Apple Inc. located in Cupertino, Calif.). In yet a further embodiment, the system is run on a Mac OS® environment (Mac OS is a registered trademark of Apple Inc. located in Cupertino, Calif.). The application is flexible and designed to run in various different environments without compromising any major functionality. In some embodiments, the system includes multiple components distributed among a plurality of computing devices. One or more components are in the form of computer-executable instructions embodied in a computer-readable medium. The systems and processes are not limited to the specific embodiments described herein. In addition, components of each system and each process can be practiced independently and separately from other components and processes described herein. Each component and process can also be used in combination with other assembly packages and processes.

In one embodiment, a computer program is provided, and the program is embodied on a computer-readable medium and utilizes a Structured Query Language (SQL) with a client user interface front-end for administration and a web interface for standard user input and reports. In another embodiment, the system is web enabled and is run on a business entity intranet. In yet another embodiment, the system is fully accessed by individuals having an authorized access outside the firewall of the business-entity through the Internet. In a further embodiment, the system is being run in a Windows® environment (Windows is a registered trademark of Microsoft Corporation, Redmond, Wash.). The application is flexible and designed to run in various different environments without compromising any major functionality.

As used herein, an element or step recited in the singular and preceded with the word "a" or "an" should be understood as not excluding plural elements or steps, unless such exclusion is explicitly recited. Furthermore, references to "example embodiment" or "one embodiment" of the present disclosure are not intended to be interpreted as excluding the existence of additional embodiments that also incorporate the recited features.

As used herein, the term "database" may refer to either a body of data, a relational database management system (RDBMS), or to both. A database may include any collection of data including hierarchical databases, relational databases, flat file databases, object-relational databases, object oriented databases, and any other structured collection of records or data that is stored in a computer system. The above examples are for example only, and thus, are not intended to limit in any way the definition and/or meaning of the term database. Examples of RDBMS's include, but are not limited to including, Oracle® Database, MySQL, IBM® DB2, Microsoft® SQL Server, Sybase®, and PostgreSQL. However, any database implementation (e.g., relational, document-based) may be used that enables the system and methods described herein. (Oracle is a registered trademark of Oracle Corporation, Redwood Shores, Calif.; IBM is a registered trademark of International Business Machines Corporation, Armonk, N.Y.; Microsoft is a registered trademark of Microsoft Corporation, Redmond, Wash.; and Sybase is a registered trademark of Sybase, Dublin, Calif.)

The term processor, as used herein, may refer to central processing units, microprocessors, microcontrollers, reduced instruction set circuits (RISC), application specific integrated circuits (ASIC), logic circuits, and any other circuit or processor capable of executing the functions described herein.

As used herein, the terms "software" and "firmware" are interchangeable, and include any computer program stored in memory for execution by a processor, including RAM memory, ROM memory, EPROM memory, EEPROM memory, and non-volatile RAM (NVRAM) memory. The above memory types are for example only, and are thus not limiting as to the types of memory usable for storage of a computer program.

FIG. 1 is a schematic diagram illustrating an secure token (ST) system 100. ST system 100 includes at least one ST computing device 110 in communication with at least one credit issuer computing device 120, at least one credit reporting (e.g., Experian®, Equifax®, Transunion®) computing device 130, at least one user computing device 140, and/or at least one third party computing device 150. ST computing device 110 is further in communication with at least one database 112 that may store and/or process data, such as secure tokens, hash values, unique identifiers, and customer data.

In the example embodiment, a credit issuer may register a customer with the ST service using customer data associated with the customer. Credit issuer computing device 120 may collect and store the customer data as part of performing a minimal Know Your Customer (KYC) check of the customer. Credit issuer computing device 120 may perform the KYC check at the time the customer opens an account with the issuer. The KYC check may comply with government regulations designed to verify clients of the credit issuer in order to prevent money laundering, financing terrorism and other crimes involving money. The KYC check may also implement policies, procedures and technology used by, for example, payment card issuers and other financial institutions to comply with KYC regulations.

Additionally or alternatively, ST computing device 110 may register the customer by receiving the customer data from a user computing device associated with the customer. User computing device 140 may include a web-enabled phone (e.g., a "smartphone"), a personal digital assistant (PDA), a desktop computer, a laptop computer, a cellular phone, a tablet, a phablet, or other web-based connectable equipment the customer may use to communicate with other computing devices.

The customer data may include, among other data, a customer identifier (e.g., a customer social security number (SSN)), customer authentication credentials (e.g., customer name, password, biometric data, security questions, security answers, or the like), customer account data (e.g., primary account number (PAN), bank identification number (BIN), or other account related information), a user computing device identifier, a customer social security number, a customer email address, a customer home address, a customer work address, a customer phone number, a customer driver's license number, and/or other data associated with the customer.

In some embodiments, the customer data is anonymized and aggregated (e.g., by credit issuer computing device 120 and/or user computing device 140) prior to receipt by ST computing device 110 (i.e., no personally identifiable information (PII) is received by ST computing device 110). In other embodiments, ST computing device 110 may be configured to receive customer data not yet being anonymized and/or aggregated, and thus ST computing device 110 may be configured to anonymize and aggregate the customer data. In such embodiments, any PII received by ST computing device 110 is received and processed in an encrypted format, or is received with the consent of individuals with which the PII is associated. In situations in which the systems discussed herein collect personal information about individuals including customers, or may make use of such personal information, individuals may be provided with an opportunity to control whether such information is collected or to control whether and/or how such information is used. In addition, certain data may be processed in one or more ways before it is stored or used, so that personally identifiable information is removed In the example embodiment, as part of the registration process, ST computing device 110 receives a primary account number (PAN) assigned by credit issuer computing device 120 to the customer as well as the customer's social security number (SSN). Specifically, ST computing device 110 generates a hash value for the customer data using the SSN, and also generates a unique identifier for each PAN. For example, ST computing device 110 may generate one hash value per customer (e.g., each customer has only one SSN) and one or more unique identifiers (e.g., each user may have one or more PANs associated with accounts of the customer at one or more credit issuers). Once ST computing device 110 generates the hash value and the one or more unique identifiers, ST computing device 110 combines the hash value and the one or more unique identifiers into an encrypted token associated with the customer, also referred to herein as a secure token. Thus, in the example embodiment, a secure token includes one or more unique identifiers and a hash value of the customer data. The secure token enables ST computing device 110 to identify a customer profile of a customer without using personally identifiable information (PII) of the customer, such as the customer's SSN.

In the example embodiment, ST computing device 110 is configured to store the secure token within a database, such as an identity database 112. ST computing device 110 is also configured to transmit the secure token to at least one credit issuer computing device and/or at least one credit reporting (CR) computing device. Credit issuer computing device 120 and CR computing device 130 may each store the secure token locally. In some embodiments, credit issuer computing device 120 may transmit the secure token to CR computing device 130, for example in combination with a credit status report regarding the customer account.

In some embodiments, a user computing device subsequently initiates a request for data corresponding to a customer using a customer data request (e.g., a credit report request). User computing device 140 may be associated with the customer requesting his or her own data to CR computing device 130. For example, the customer may access CR computing device 130 (e.g., a credit bureau) to check his or her own credit score and/or credit report. The customer may input into user computing device 140 login information to access the ST service, via CR computing device 130, and user computing device 140 may transmit the customer data request, including the customer login information, to CR computing device 130. In the example embodiment, CR computing device 130 authenticates the user who transmitted the customer data request as the customer by comparing the information submitted by user computing device 140 to the secure token. In one example, CR computing device 130 may require the user to submit his or her SSN as part of the customer data request. CR computing device 130 calculates the hash value for the SSN and queries all secure tokens stored at CR computing device 130 for a matching hash value. In another example, the customer submits his or her own SSN as part of the registration process with the ST service and the hashed SSN is linked to the customer's login information. Therefore, CR computing device 130 may not require the user to re-submit his or her SSN with the customer data request. When a matching value for the hash of the submitted SSN or the stored hashed value associated with the login information is found, CR computing device 130 retrieves the secure token corresponding to the customer.

In some embodiments, CR computing device 130 may transmit the customer data request, along with the secure token, to credit issuer computing device 120 for authentication of the user. Credit issuer computing device 120 transmits to CR computing device 130, in response to receiving the customer data request, an authentication that verifies that the user associated with the customer data request is the authentic user. Advantageously, CR computing device 130 is not required to store the SSN itself in order to match a customer-submitted SSN (either at the time the customer accesses the ST service or at the time the customer registers with the ST service) to the correct customer record, thus reducing vulnerability of CR computing device 130 to data breaches.

In one example, once the matching secure token is retrieved, CR computing device 130 transmits the secure token to credit issuer computing device 120. Credit issuer computing device 120 is configured to retrieve the hash value and the one or more unique identifiers from the secure token, parse a database for a matching hash value and matching unique identifiers, retrieve the matching information, generate a report using the retrieved information, and transmit the report to CR computing device 130. CR computing device 130 receives the report, generates a credit report using the received report, and transmits the credit report to user computing device 140 via display on a web page hosted by CR computing device 130, or via display on a user application executing on user computing device 140. The credit report may include a credit score for the customer. In another example, CR computing device 130 generates the credit report using the customer data request and the secure token associated with the customer, and transmits the credit report to user computing device 140 in the similar fashion as described above.

In the example embodiment, once the matching secure token is retrieved, CR computing device 130 is configured to transmit the generated report to user computing device 140. In other embodiments, CR computing device 130 may transmit the credit score to user computing device 140 in the form of a data file and instruct user computing device 140 to generate a report using the data file. Once the report is received or generated by user computing device 140, user computing device 140 is configured to display the report to the customer.

In other embodiments, a third party computing device initiates a request for data associated with a customer by submitting the customer data request. Third party computing device 150 may be associated with a third party (e.g., a landlord, a lender, an agency, an employer, and/or other type of third party) interested in obtaining credit history or other information related to the customer. The third party may input into third party computing device 150 login information to access the ST service via CR computing device 130, and third party computing device 150 may transmit the customer data request, including the third party login information and the customer's SSN, to CR computing device 130. For example, as part of an authorization by the customer for the third party to obtain the customer's credit report, the customer provides his or her SSN to the third party, and the third party submits the SSN as part of the customer data request. CR computing device 130 retrieves the SSN from the customer data request, calculates the hash value for the SSN, and queries all secure tokens stored at CR computing device 130 for a matching hash value. When a matching value is found, CR computing device 130 retrieves the secure token corresponding to the customer, as described above.

In the example embodiment, CR computing device 130 recognizes the customer data request as submitted by the third party. For example, CR computing device 130 identifies a flag, within the customer data request, indicating that the requestor of the customer data is a third party. Specifically, CR computing device 130 receives the customer data request, parses the customer data request, identifies the flag, and determines that the requestor of the customer data request is the third party.

In general, third parties require more information of the customer besides the customer's credit score. Because CR computing device 130 does not store other information of the customer but the secure token, CR computing device 130 transmits (e.g., reroutes) the customer data request along with the secure token to ST computing device 110. For example, CR computing device 130 retrieves the flag from the customer data request, and embeds the flag and the secure token within a computer message, which may be the customer data request.

In the example embodiments, ST computing device 110 receives the flag and the secure token. In one embodiment, in response to ST computing device 110 receiving the flag and the secure token, ST computing device 110 transmits the secure token and/or a request for customer data of the customer to credit issuer computing device 120. The transmitted request may be the computer message received by ST computing device 110, or another type of suitable computer message that enables ST computing device 110 to request the customer data of the customer. In response to receiving the request, credit issuer computing device 120 retrieves the customer data associated with the customer, using the hash value included in the secure token, and transmits the customer data and the secure token to ST computing device 110. The customer data retrieved may include the customer's name, the customer address, the customer's PANs, and other information associated with the customer. ST computing device 110 may update the secure token in response to receiving updated customer data from the credit issuer computing device 120. For example, ST computing device 110 may detect that the customer data is updated by matching, for example, the hash value received in the secure token to a stored hash value, comparing the customer data (e.g., one or more unique identifiers that may correspond to one or more PANs associated with accounts of the customer at one or more credit issuers) associated with the received hash to the stored customer data, and detecting that the received customer data differs from the stored customer data. In response to detecting the updated customer data, ST computing device 110 updates the secure token. For example, ST computing device 110 may assign a unique identifiers to each of the one or more unique identifiers that do not match to the stored unique identifiers, and may include the assigned unique identifiers into the secure token.

In another embodiment, once ST computing device 110 receives the flag and the secure token, ST computing device 110 retrieves the hash value from the secure token and parses identity database 112, using the hash value, to retrieve the customer data associated with the customer. The customer data retrieved by ST computing device 110 may be substantially similar to the customer data retrieved by credit issuer computing device 120, as described above.

In the example embodiment, ST computing device 110 masks some information of the customer data as unnecessary or unauthorized before transmitting the masked information to CR computing device 130. In particular, ST computing device 110 masks the customer data based on the flag (e.g., the type of third party requesting the customer data). For example, a landlord may require information related to the customer's previous addresses, while a lender may require information related to the customer's previous and current bank accounts. In the landlord example, ST computing device 110 may be configured to provide the customer's previous address information, in a complete or masked form, and may or may not provide other information, i.e., ST computing device 110 may not provide the customer's masked bank account information to the landlord. In the lender example, ST computing device 110 may be configured to provide the customer's bank account information, in a complete or masked form, and may or may not provide other information, i.e., ST computing device 110 may not provide the customer's masked previous address information to the lender. Once ST computing device 110 masks the unnecessary or unauthorized information, ST computing device 110 transmits the customer data to CR computing device 130 along with the secure token.

CR computing device 130 receives the customer data and transmits the customer data to third party computing device 150 along with, for example, the customer's credit score. In the example embodiment, CR computing device 130 may be configured to transmit the customer data and the credit score to third party computing device 150 in the form of a report. In other embodiments, CR computing device 130 may transmit the customer data and the credit score to third party computing device 150 in the form of a data file and instruct third party computing device 150 to generate a report using the data file. Once the report is received or generated by third party computing device 150, third party computing device 150 is configured to display the report to the third party in similar fashion as described above with respect to user computing device 140.

Figure 2:
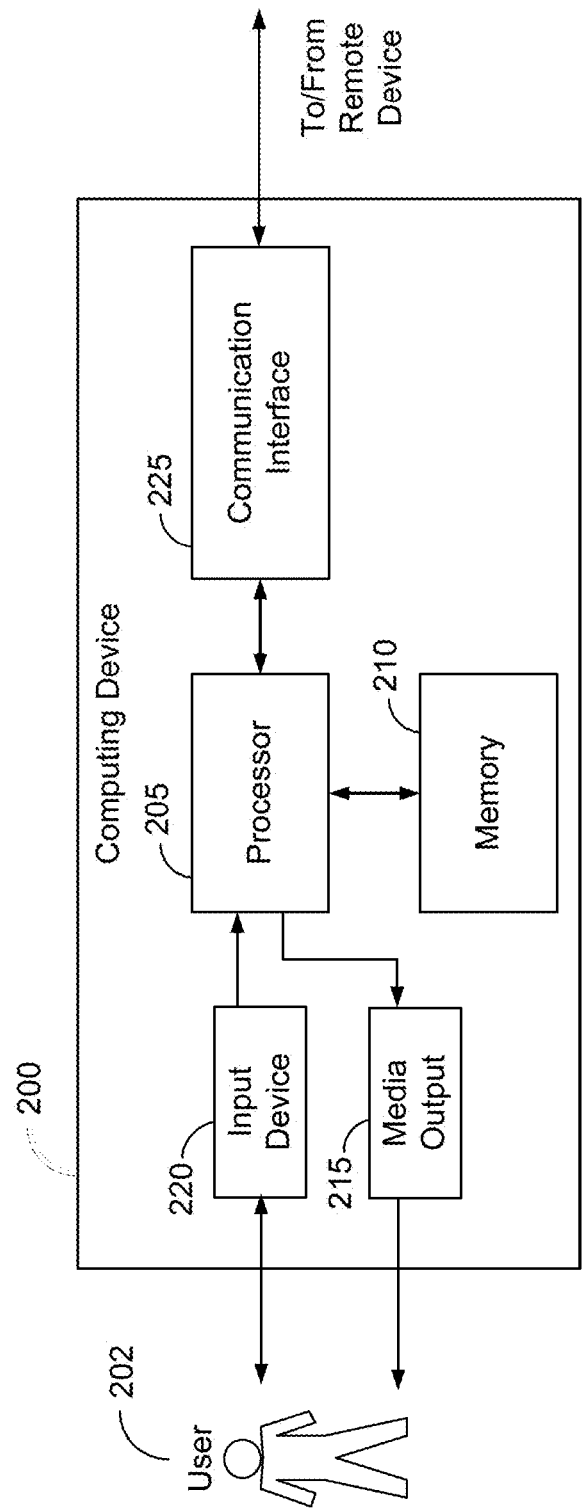

FIG. 2 illustrates an example configuration of a computing device 200, such as credit issuer computing device 120, CR computing device 130, user computing device 140, and third party computing device 150 (all shown in FIG. 1). In the example embodiment, computing device 200 includes a processor 205 for executing instructions. In some embodiments, executable instructions are stored in a memory 210. Processor 205 may include one or more processing units, for example, a multi-core configuration. Memory 210 is any device allowing information such as executable instructions and/or written works to be stored and retrieved. Memory 210 may include one or more computer readable media.

Computing device 200 also includes at least one media output component 215 for presenting information to user 202. User 202 may include, but is not limited to, user 202. Media output component 215 is any component capable of conveying information to user 202. In some embodiments, media output component 215 includes an output adapter such as a video adapter and/or an audio adapter. An output adapter is operatively coupled to processor 205 and operatively connectable to an output device such as a display device, a liquid crystal display (LCD), organic light emitting diode (OLED) display, or "electronic ink" display, or an audio output device, a speaker or headphones.

In some embodiments, computing device 200 includes an input device 220 for receiving input from user 202. Input device 220 may include, for example, a keyboard, a pointing device, a mouse, a stylus, a touch sensitive panel, a touch pad, a touch screen, a gyroscope, an accelerometer, a position detector, an audio input device, a fingerprint reader/scanner, a palm print reader/scanner, a iris reader/scanner, a retina reader/scanner, a profile scanner, a hand gesture reader/scanner, or the like. A single component, such as a touch screen, may function as both an output device of media output component 215 and input device 220. A single component such as a touch screen may function as both an output device of media output component 215 and input device 220. Computing device 200 may also include a communication interface 225, which is communicatively connectable to a remote device such as ST computing device 110 (shown in FIG. 1). Communication interface 225 may include, for example, a wired or wireless network adapter or a wireless data transceiver for use with a mobile phone network, Global System for Mobile communications (GSM), 3G, or other mobile data network or Worldwide Interoperability for Microwave Access (WIMAX).

Stored in memory 210 are, for example, computer readable instructions for providing a user interface to user 202 via media output component 215 and, optionally, receiving and processing input from input device 220. A user interface may include, among other possibilities, a web browser and client application. Web browsers enable users, such as user 202, to display and interact with media and other information typically embedded on a web page or a website from ST computing device 110. A client application allows user 202 to interact with a ST computing device application from computing device 200.

Figure 3:
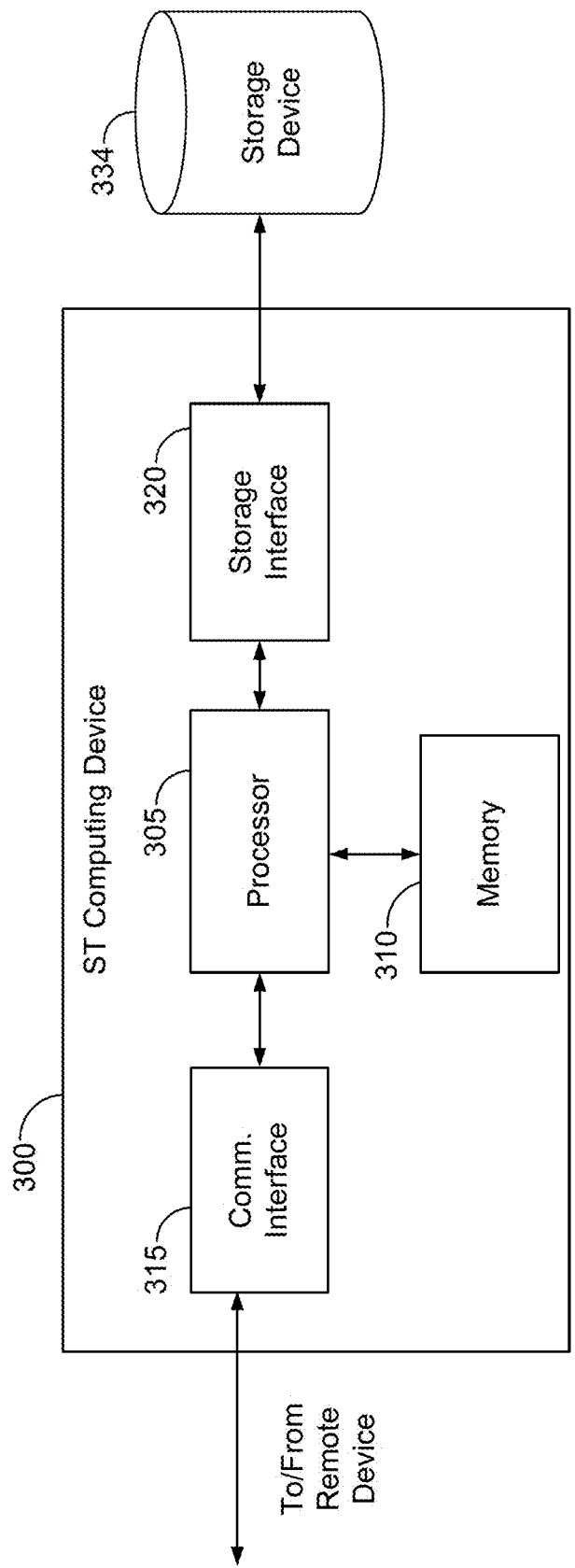

FIG. 3 illustrates an example configuration of a ST computing device 300, such as ST computing device 110 (shown in FIG. 1). ST computing device 300 may include, but is not limited to, identity database 112 (shown in FIG. 1).

ST computing device 300 includes a processor 305 for executing instructions. Instructions may be stored in a memory 310, for example. Processor 305 may include one or more processing units (e.g., in a multi-core configuration) for executing instructions. The instructions may be executed within a variety of different operating systems on the ST computing device 300, such as UNIX, LINUX, Microsoft Windows®, etc. More specifically, the instructions may cause various data manipulations on data stored in storage device 334 (e.g., create, read, update, and delete procedures). It should also be appreciated that upon initiation of a computer-based method, various instructions may be executed during initialization. Some operations may be required in order to perform one or more processes described herein, while other operations may be more general and/or specific to a particular programming language (e.g., C, C #, C++, Java, or other suitable programming languages, etc.).

Processor 305 is operatively coupled to a communication interface 315 such that service provider ST computing device 300 is capable of communicating with a remote device, such as a computer device 200 (shown in FIG. 2) or another ST computing device 300. For example, communication interface 315 may receive and transmit communications from credit issuer computing device 120, CR computing device 130, user computing device 140, and third party computing device 150 (all shown in FIG. 1) via a virtual private network (VPN) connection. In other words, ST computing device 300 and one or more computing devices are in a secure data processing domain, which is generally isolated from the public Internet and unrelated computing devices. In some embodiments, communication interface 315 may receive and transmit communications from credit issuer computing device 120, CR computing device 130, user computing device 140, and third party computing device 150 via the Internet.

Processor 305 may also be operatively coupled to a storage device 334. Storage device 334 is any computer-operated hardware suitable for storing and/or retrieving data. In some embodiments, storage device 334 is integrated in ST computing device 300. In other embodiments, storage device 334 is external to service provider ST computing device 300 and is similar to identity database 112 (shown in FIG. 1). For example, ST computing device 300 may include one or more hard disk drives as storage device 334. In other embodiments, storage device 334 is external to ST computing device 300 and may be accessed by a plurality of ST computing devices 300. For example, storage device 334 may include multiple storage units such as hard disks or solid state disks in a redundant array of inexpensive disks (RAID) configuration. Storage device 334 may include a storage area network (SAN) and/or a network attached storage (NAS) system.

In some embodiments, processor 305 is operatively coupled to storage device 334 via a storage interface 320. Storage interface 320 is any component capable of providing processor 305 with access to storage device 334. Storage interface 320 may include, for example, an Advanced Technology Attachment (ATA) adapter, a Serial ATA (SATA) adapter, a Small Computer System Interface (SCSI) adapter, a RAID controller, a SAN adapter, a network adapter, and/or any component providing processor 305 with access to storage device 334.

Memory 310 may include, but is not limited to, random access memory (RAM) such as dynamic RAM (DRAM) or static RAM (SRAM), read-only memory (ROM), erasable programmable read-only memory (EPROM), electrically erasable programmable read-only memory (EEPROM), and non-volatile RAM (NVRAM). The above memory types are exemplary only, and are thus not limiting as to the types of memory usable for storage of a computer program.

Figure 4:
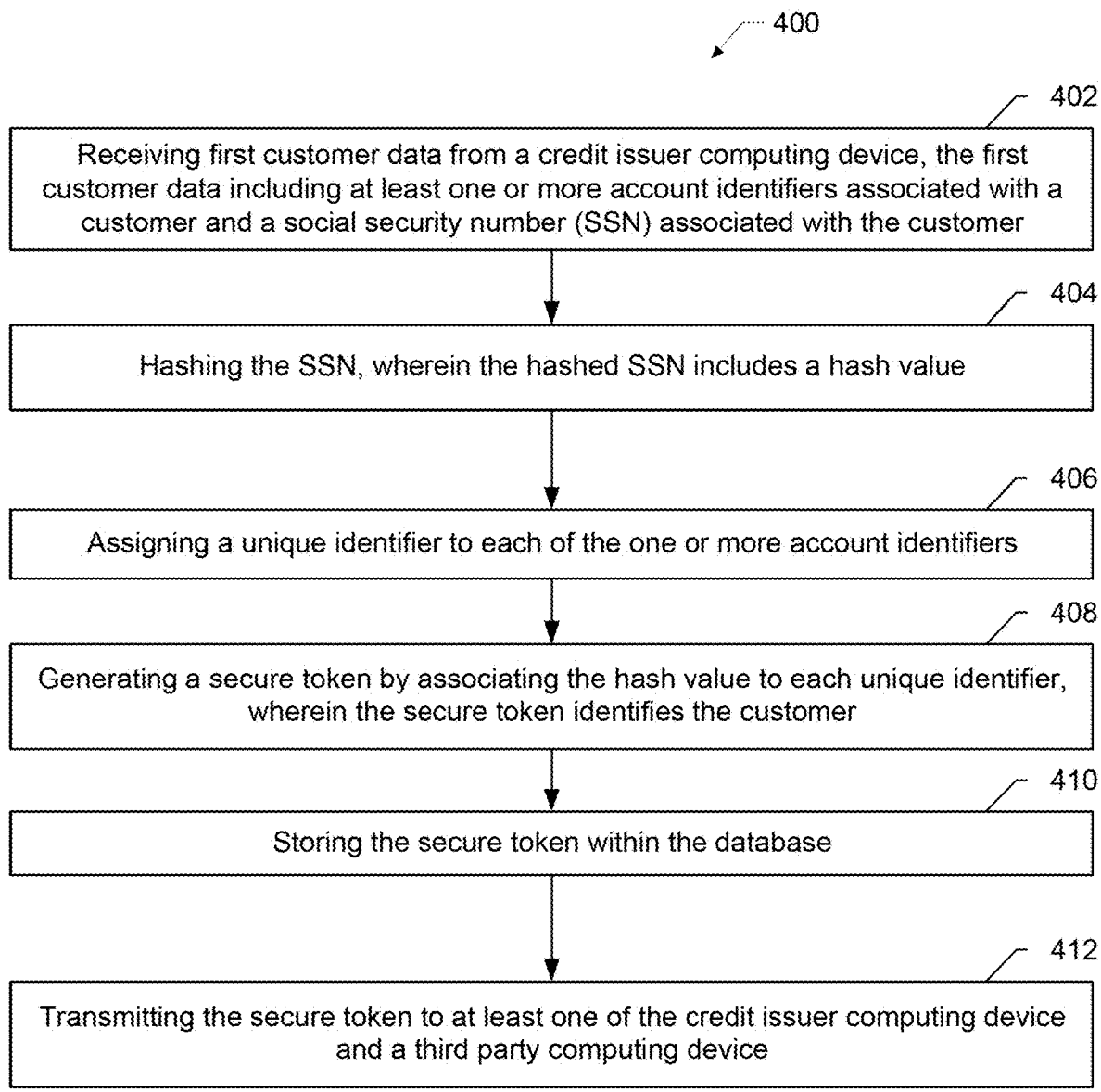

FIG. 4 is an example flow diagram illustrating a method flow 400 by which ST system 100 (shown in FIG. 1) generates and provisions data securely using secure tokens using ST computing device 110 (shown in FIG. 1) in communication with a database, such as identity database 112 (shown in FIG. 1). Method 400 includes receiving 402 first customer data from credit issuer computing device 120 (shown in FIG. 1), the first customer data including at least one or more account identifiers associated with a customer and a social security number (SSN) associated with the customer. Method 400 also includes hashing 404 the SSN, wherein the hashed SSN includes a hash value, assigning 406 a unique identifier to each of the one or more account identifiers, and generating 408 a secure token by associating the hash value to each unique identifier, wherein the secure token identifies the customer. Method 400 further includes storing 410 the secure token within the database, and transmitting the secure token to at least one of credit issuer computing device 120 and a third party computing device 150 (shown in FIG. 1).

Figure 5:
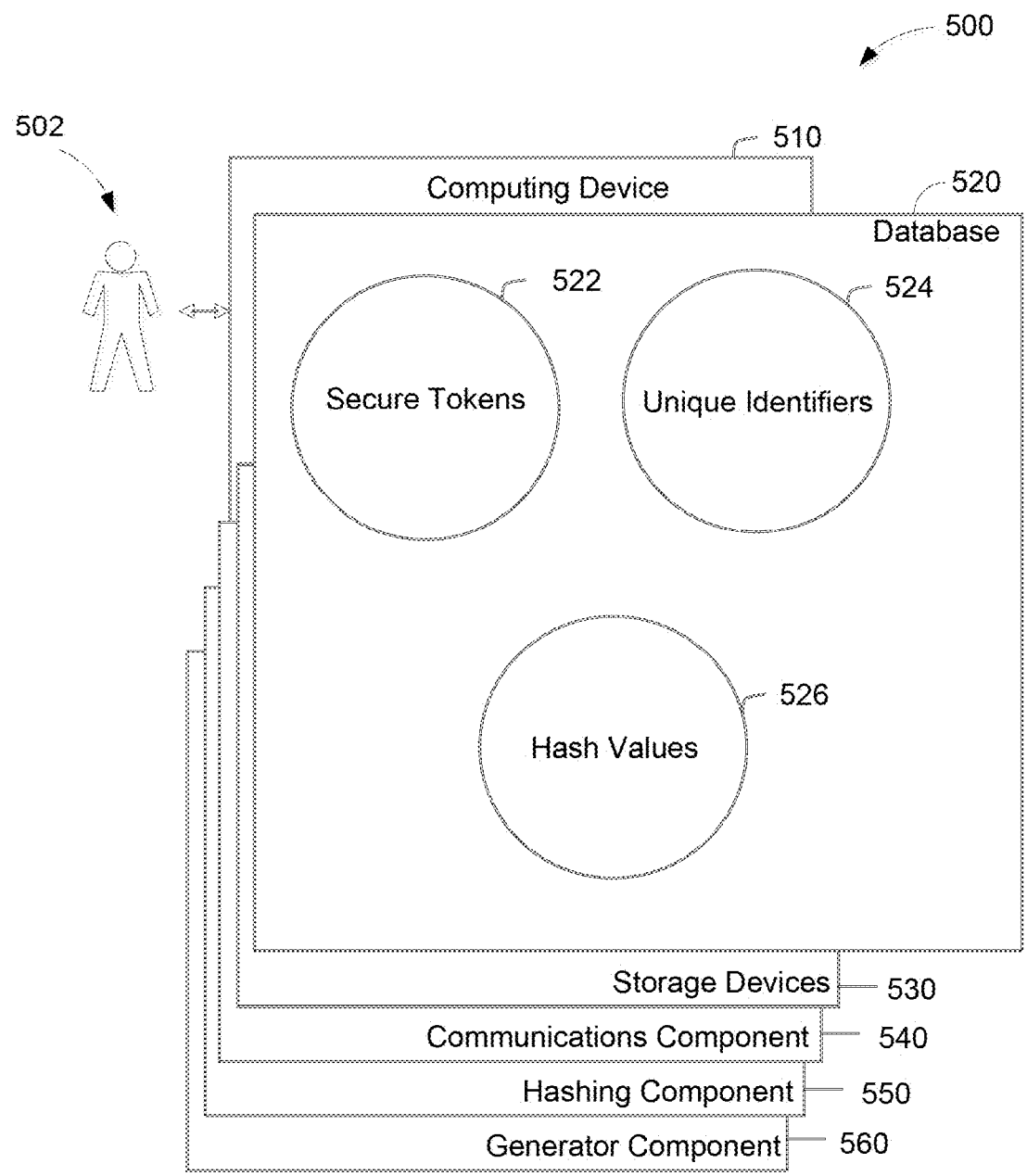

FIG. 5 is a diagram 500 of computer components of one or more example computing devices that may be used in ST system 100 shown in FIG. 1. In some embodiments, computing device 510 is used to implement ST computing device 110 (shown in FIG. 1). The computer components may be used to generate and provision data securely using secure tokens using customer data. Operator 502 (such as a user operating ST computing device 110) may access computing device 510 in order to service computing device 510. In some embodiments, database 520 is similar to database 112 (shown in FIG. 1). Database 520 may be coupled with several separate components within computing device 510, which perform specific tasks. In the example embodiment, database 520 includes secure token 522, unique identifiers 524, and hash values 526.

Computing device 510 includes database 520, as well as storage devices 530, for storing data within database 520, such as storing 410 (shown in FIG. 4) a secure token, such as one of secure tokens 522. The data being stored may also include unique identifiers 524 and hash values 526. Computing device 510 also includes communications component 540 for receiving 402 (shown in FIG. 4) first customer data from credit issuer computing device 120 (shown in FIG. 1) and transmitting 412 (shown in FIG. 4) secure tokens, such as secure tokens 522, to at least one of credit issuer computing device 120 and third party computing device 150 (shown in FIG. 1).

Computing device 510 also includes hashing component 550 for hashing 404 (shown in FIG. 4) a received SSN included in the first customer data, wherein the hashed SSN includes a hash value, such as one of hash values 526, and assigning 406 (shown in FIG. 4) a unique identifier, such as one of unique identifiers 524, to each of the received one or more account identifiers included in the first customer data. Computing device 510 further includes generator component 560 for generating 408 (shown in FIG. 4) a secure token, such as one of secure tokens 522.

Having described aspects of the disclosure in detail, it will be apparent that modifications and variations are possible without departing from the scope of aspects of the disclosure as defined in the appended claims. As various changes could be made in the above constructions, products, and methods without departing from the scope of aspects of the disclosure, it is intended that all matter contained in the above description and shown in the accompanying drawings shall be interpreted as illustrative and not in a limiting sense.

While the disclosure has been described in terms of various specific embodiments, those skilled in the art will recognize that the disclosure can be practiced with modification within the spirit and scope of the claims.

As used herein, the term "non-transitory computer-readable media" is intended to be representative of any tangible computer-based device implemented in any method or technology for short-term and long-term storage of information, such as, computer-readable instructions, computer-executable instructions, data structures, program modules and sub-modules, or other data in any device. Therefore, the methods described herein may be encoded as executable instructions embodied in a tangible, non-transitory, computer readable medium, including, without limitation, a storage device and/or a memory device. Such instructions, when executed by a processor, cause the processor to perform at least a portion of the methods described herein. Moreover, as used herein, the term "non-transitory computer-readable media" includes all tangible, computer-readable media, including, without limitation, non-transitory computer storage devices, including, without limitation, volatile and nonvolatile media, and removable and non-removable media such as a firmware, physical and virtual storage, CD-ROMs, DVDs, and any other digital source such as a network or the Internet, as well as yet to be developed digital means, with the sole exception being a transitory, propagating signal.

As will be appreciated based on the foregoing specification, the above-described embodiments of the disclosure may be implemented using computer programming or engineering techniques including computer software, firmware, hardware or any combination or subset thereof, wherein the technical effect is a flexible and fast system for various aspects of fraud analysis for registration of merchants with acquirer banks. Any such resulting program, having computer-readable code means, may be embodied or provided within one or more computer-readable media, thereby making a computer program product, i.e., an article of manufacture, according to the discussed embodiments of the disclosure. The article of manufacture containing the computer code may be made and/or used by executing the code directly from one medium, by copying the code from one medium to another medium, or by transmitting the code over a network.

In addition, although various elements of the secure token (ST) computing device are described herein as including general processing and memory devices, it should be understood that the ST computing device is a specialized computer configured to perform the steps described herein for generating and provisioning secure tokens over a communications network.

This written description uses examples to disclose the embodiments, including the best mode, and also to enable any person skilled in the art to practice the embodiments, including making and using any devices or systems and performing any incorporated methods. The patentable scope of the disclosure is defined by the claims, and may include other examples that occur to those skilled in the art. Such other examples are intended to be within the scope of the claims if they have structural elements that do not differ from the literal language of the claims, or if they include equivalent structural elements with insubstantial locational differences from the literal language of the claims.

What is claimed is:

1. A secure token (ST) system for provisioning data using secure tokens over a network, the ST system comprising a ST computing device including at least one processor in communication with a database, the at least one processor configured to:
   receive first customer data from a credit issuer computing device via network communication in a secure processing domain, the first customer data including at least one or more account identifiers associated with a customer and a social security number (SSN) associated with the customer, wherein the secure data processing domain is isolated from the public Internet;
   hash the SSN, wherein the hashed SSN includes a hash value;
   generate one or more unique identifiers, wherein each of the one or more unique identifiers is assigned to one of the one or more account identifiers;
   generate a secure token by combining the hash value and the one or more unique identifiers, wherein the secure token identifies a customer profile associated with the customer;
   store the secure token within the database;
   transmit the secure token via network communication in the secure processing domain to the credit issuer computing device and a credit reporting (CR) computing device;
   receive, from the CR computing device via network communication in the secure processing domain, a customer data request associated with the one or more account identifiers, wherein the customer data request includes the secure token previously transmitted to the CR computing device and a flag, wherein the flag indicates that a third party computing device initiated the customer data request by submitting the SSN to the CR computing device, and wherein the CR computing device is not required to store the SSN in order to match the SSN submitted by the third party to the secure token previously transmitted to the CR computing device, thereby reducing vulnerability of the CR computing device to data breaches; and
   in response to the customer data request, transmit, via network communication in the secure processing domain, second customer data of the customer to the CR computing device for reporting to the third party computing device.

2. The ST computing device of claim 1 wherein the at least one processor is further configured to:
   in response to the customer data request, again transmit the secure token to the credit issuer computing device via network communication in the secure processing domain; and
   in response of again transmitting the secure token, receive the second customer data of the customer from the credit issuer computing device via network communication in the secure processing domain.

3. The ST computing device of claim 1 wherein the at least one processor is further configured to:
   identify a type of requestor associated with the third party computing device; and
   prior to transmitting the second customer data of the customer to the CR computing device, mask information from the second customer data based on the type of requestor.

4. The ST computing device of claim 1 wherein the at least one processor is further configured to update the secure token based on the second customer data.

5. The ST computing device of claim 1, wherein generating the secure token further comprises encrypting the hash value and the one or more unique identifiers.

6. The ST computing device of claim 1, wherein each the first and second customer data include at least one of a customer name, a customer address, or a customer PAN.

7. A computer-implemented method for provisioning data using secure tokens over a network, the method implemented by at least one secure token (ST) computing device including at least one processor in communication with a database, said method comprising steps performed by the at least one processor of:
  receiving first customer data from a credit issuer computing device via network communication in a secure processing domain, the first customer data including at least one or more account identifiers associated with a customer and a social security number (SSN) associated with the customer, wherein the secure data processing domain is isolated from the public Internet;
  hashing the SSN, wherein the hashed SSN includes a hash value;
  generate one or more unique identifiers, wherein each of the one or more unique identifiers is assigned to one of the one or more account identifiers;
  generating a secure token by combining the hash value and the one or more unique identifiers, wherein the secure token identifies a customer profile associated with the customer;
  storing the secure token within the database;
  transmitting the secure token to the credit issuer computing device and a credit reporting (CR) computing device;
  receiving, from the CR computing device via network communication in the secure processing domain, a customer data request associated with the one or more account identifiers, wherein the customer data request includes the secure token previously transmitted to the CR computing device and a flag, wherein the flag indicates that a third party computing device initiated the customer data request by submitting the SSN to the CR computing device, and wherein the CR computing device is not required to store the SSN in order to match the SSN submitted by the third party to the secure token previously transmitted to the CR computing device, thereby reducing vulnerability of the CR computing device to data breaches; and
  in response to the customer data request, transmitting, via network communication in the secure processing domain, second customer data of the customer to the CR computing device for reporting to the third party computing device.

8. The method of claim 7, wherein the method further comprises:
  in response to the customer data request, again transmitting the secure token to the credit issuer computing device via network communication in the secure processing domain; and
  in response of again transmitting the secure token, receiving second customer data of the customer from the credit issuer computing device via network communication in the secure processing domain.

9. The method of claim 7, wherein the method further comprises:
  identifying a type of requestor associated with the third party computing device; and
  prior to transmitting the second customer data of the customer to the CR computing device, masking information from the second customer data based on the type of requestor.

10. The method of claim 7, wherein the method further comprises updating the secure token based on the second customer data.

11. The method of claim 7, wherein generating the secure token further comprises encrypting the hash value and the one or more unique identifiers.

12. A non-transitory computer-readable storage medium having computer-executable instructions embodied thereon, wherein when executed by at least one secure token (ST) computing device including at least one processor in communication with a database, the computer-executable instructions cause the ST computing device to:
  receive first customer data from a credit issuer computing device via network communication in a secure processing domain, the first customer data including at least one or more account identifiers associated with a customer and a social security number (SSN) associated with the customer, wherein the secure data processing domain is isolated from the public Internet;
  hash the SSN, wherein the hashed SSN includes a hash value;
  generate one or more unique identifiers, wherein each of the one or more unique identifiers is assigned to one of the one or more account identifiers;
  generate a secure token by combining the hash value and the one or more unique identifiers, wherein the secure token identifies a customer profile associated with the customer;
  store the secure token within the database;
  transmit the secure token to the credit issuer computing device and a credit reporting (CR) computing device;
  receive, from the CR computing device via network communication in the secure processing domain, a customer data request associated with the one or more account identifiers, wherein the customer data request includes the secure token previously transmitted to the CR computing device and a flag, wherein the flag indicates that a third party computing device initiated the customer data request by submitting the SSN to the CR computing device, and wherein the CR computing device is not required to store the SSN in order to match the SSN submitted by the third party to the secure token previously transmitted to the CR computing device, thereby reducing vulnerability of the CR computing device to data breaches; and
  in response to the customer data request, transmit, via network communication in the secure processing domain, second customer data of the customer to the CR computing device for reporting to the third party computing device.

13. The computer-readable storage medium of claim 12, wherein the computer-executable instructions further cause the ST computing device to:
  in response to the customer data request, again transmit the secure token to the credit issuer computing device via network communication in the secure processing domain; and
  in response of again transmitting the secure token, receive second customer data of the customer from the credit issuer computing device via network communication in the secure processing domain.

14. The computer-readable storage medium of claim 12, wherein the computer-executable instructions further cause the ST computing device to:
- identify a type of requestor associated with the third party computing device; and
- prior to transmitting the second customer data of the customer to the CR computing device, mask information from the second customer data based on the type of requestor.

15. The computer-readable storage medium of claim 12, wherein the computer-executable instructions further cause the ST computing device to update the secure token based on the second customer data.

16. The computer-readable storage medium of claim 12, wherein the computer-executable instructions further cause the ST computing device to, in generating the secure token, encrypt the hash value and the one or more unique identifiers.

17. The ST computing device of claim 5, wherein encrypting the hash value and the one or more unique identifiers comprises encrypting using a public key of an RSA key pair.

18. The method of claim 11, wherein encrypting the hash value and the one or more unique identifiers comprises encrypting using a public key of an RSA key pair.

19. The computer-readable storage medium of claim 16, wherein the computer-executable instructions further cause the ST computing device to encrypt the hash value and the one or more unique identifiers by using a public key of an RSA key pair.

* * * * *